US 6,737,603 B2

(12) United States Patent
Yang (10) Patent No.: US 6,737,603 B2
(45) Date of Patent: May 18, 2004

(54) SW MICRO WELDER FOR DIRECTLY WELDING ENAMELED WIRES (76) Inventor: Shi tong Yang, No. 1 Hedong, New Road, Fangcun Dist., Guangzhou (CN)

( * ) Notice: Subject to any disclaimer, the term of this patent is extended or adjusted under 35 U.S.C. 154(b) by 20 days.

(21) Appl. No.: 10/165,546

(22) Filed: Jun. 7, 2002

(65) Prior Publication Data

US 2003/0226825 A1 Dec. 11, 2003

(30) Foreign Application Priority Data

Jun. 7, 2001 (CN) .......................................... 01114785 A (51) Int. Cl.$^7$ ............................................... B23K 11/24
(52) U.S. Cl. .................. 219/110; 219/56.21; 219/91.21
(58) Field of Search ........................... 219/56.21, 56.22, 219/91.21, 110

(56) References Cited

U.S. PATENT DOCUMENTS

| 3,234,354 | A | * | 2/1966 | Penberg .................. 219/56.21 |
| 3,435,184 | A | * | 3/1969 | Schroeppel et al. ..... 219/56.21 |
| 4,697,058 | A | * | 9/1987 | Mueller .................. 219/56.21 |
| 4,950,866 | A | | 8/1990 | Kojima et al. |
| 5,115,111 | A | * | 5/1992 | Fries et al. .............. 219/56.21 |
| 6,100,511 | A | | 8/2000 | Kempe |
| 6,369,346 | B1 | | 4/2002 | Gall |

* cited by examiner

*Primary Examiner*—Clifford C. Shaw
(74) *Attorney, Agent, or Firm*—Intellectual Property Property Law Group LLP; Otto O. Lee; Juneko Jackson (57) ABSTRACT

This invention deals with a spot electrical welding machine which is technically applied to the electronics industry and micro-electronic industry. A spot electrical welder optimally directly welds enameled wires, fine wires or relevant thin sheets of metal, and metal tapes with Φ 0.02 mm–Φ 0.80 mm. This spot electrical welder comprises of an electrode, a main processor which functions as a power supply control, and a weld head which is composed of an electrode clamp and an adjusting device of electrode force. Due to the special structure of the electrode's tip which has a certain resistance Ohm contact, the main processor circuits provide for a proper work current while wedding enameled wires and further eliminates the need for insulation by hand. In addition, the spot electrical welder makes weld points even and steady, allows for simple and convenient operation and lowers welding time.

5 Claims, 7 Drawing Sheets

SW MICRO WELDER FOR DIRECTLY WELDING ENAMELED WIRES

BACKGROUND

1. Field of Invention

This invention deals with a spot electrical welding machine which is technically applied to the electronics industry and micro-electronic industry. More specifically, the present invention optimally welds enameled wires, fine wires or relevant thin sheets of metal, and metal tapes with Φ0.02 mm–Φ0.80 mm directly.

Spot electrical welding is a welding process where the amount of electrical current passes through two welded metallic bodies for an instant and the electric energy which transforms heat energy melts the two wires and makes an integration of the wires. If there are insulative layers on the surface of welded metal, the electrical current cannot pass through the metallic body, therefore the spot and electrical welding will not work.

Directly welding enameled wires is often required in the electronics industry and micro-electronic industry. Spot and electrical welding machines that are used at the present time consist of three parts: an electrode, main processor and weld head. The main processor controls power supply. The weld head is composed of an electrode clamp and an electrode force adjusting device, and is fixed onto a worktable, and connected to the power supply of the main processor. Nevertheless, while using these kind of machines, the insulative paint must ultimately be stripped by hand, and thereafter the welding machine is applied to weld. It is easy to imagine how tedious and complex the techniques are and how inefficient the work is.

SUMMARY

The embodiment of the present invention solves the above-mentioned inefficiencies as a kind of spot electric welding machine. Besides functioning as general welding machines, the embodiment of the present invention has the function of directly welding enameled wires without stripping the insulative paint by hand, and can weld quickly and reliably thereby allowing for a convenient practice of welding.

In order to achieve the purposes above, an embodiment of the present invention consists of three parts: an electrode, a main processor which functions as a power supply control, and a weld head which is composed of an electrode clamp and adjusting device of electrode force. In an embodiment of the present invention, the electrode is made into two combined parallel electrodes which are made of high-temperature-resistant metal, and between the two electrodes there is an insulative surface mount adhesive such as chip-bonder which can serve the functions of agglutination, fixation, insulation and separation. These two parallel electrodes each have a tip that is placed in a way so as to have mutual Ohm contact; the contact resistance is generally less than or equal to 200 mΩ, the rest of the apparatus is mutually insulative.

According to another embodiment of the present invention, in order to meet the demand of welding diversified materials, the shape of the electrode's end face can be made into plane type, arc side type, incline type, V-type, concave arc type, cuneiform type, or one side is plane type, the other is arc side one. The main processor is made up of a pulse amplitude presetting circuit, a pulse duration (width) presetting circuit, a pulse duration (width) timing circuit, a drive circuit, a power switch circuit, a reactive circuit, a low voltage power supply circuit, a high voltage power supply circuit and a high voltage control circuit. The electrode force adjusting device is made up of a temper screw, an adjusting nut attaches to an adjusting screw, a string harnessed on the adjusting screw, and a restricting position clamp.

According to another embodiment of the present invention, the weld force can be conveniently displayed by having a sampling slide-wire resistance, a function converter and a digital display attached on the adjusting device of the weld force, and the movable contact of the sampling slide-wire resistance is fixed on the adjusting nut, the input of the function converter and one of the closed terminations is connected with the movable contact, and the output is connected with the digital display. When welding thinner and smaller welded work pieces, a microscope is placed on the bracket of the embodiment of the present invention. The microscope is connected with the bracket through the angle adjusting setup of the microscope.

While operating, the power switch is on and the power supply is triggered when a weld force which is applied on the electrode reaches a preset value. The main processor supplies a pulse current in terms of a preset pulse amplitude and duration (width); the pulse current passes through the electrode's tip which has a certain resistance, and makes the tip generate heat. The insulators on the enameled wire are smelt and metal wire is thereby exposed. Due to the special structure of the electrode, the pulse current continues to pass across the wire and metal base along with the action of the adjusting device of weld force, resulting in spot electric fusion welding.

In other words, the embodiment of the present invention operates a welding process of stripping and spot electric welding under the collective actions of a pulse voltage, pulse time and weld force which are set by the main processor and performed by a specially designed electrode. Since the electrode's tip is made into a particular structure with a certain resistance Ohm contact, the main processor circuits provide a proper work current that allows for welding enameled wires, without having to eliminate insulation by hand. In addition, the embodiment of the present invention can make weld points even and steady, allow for simple and convenient operation and cut welding time much shorter.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
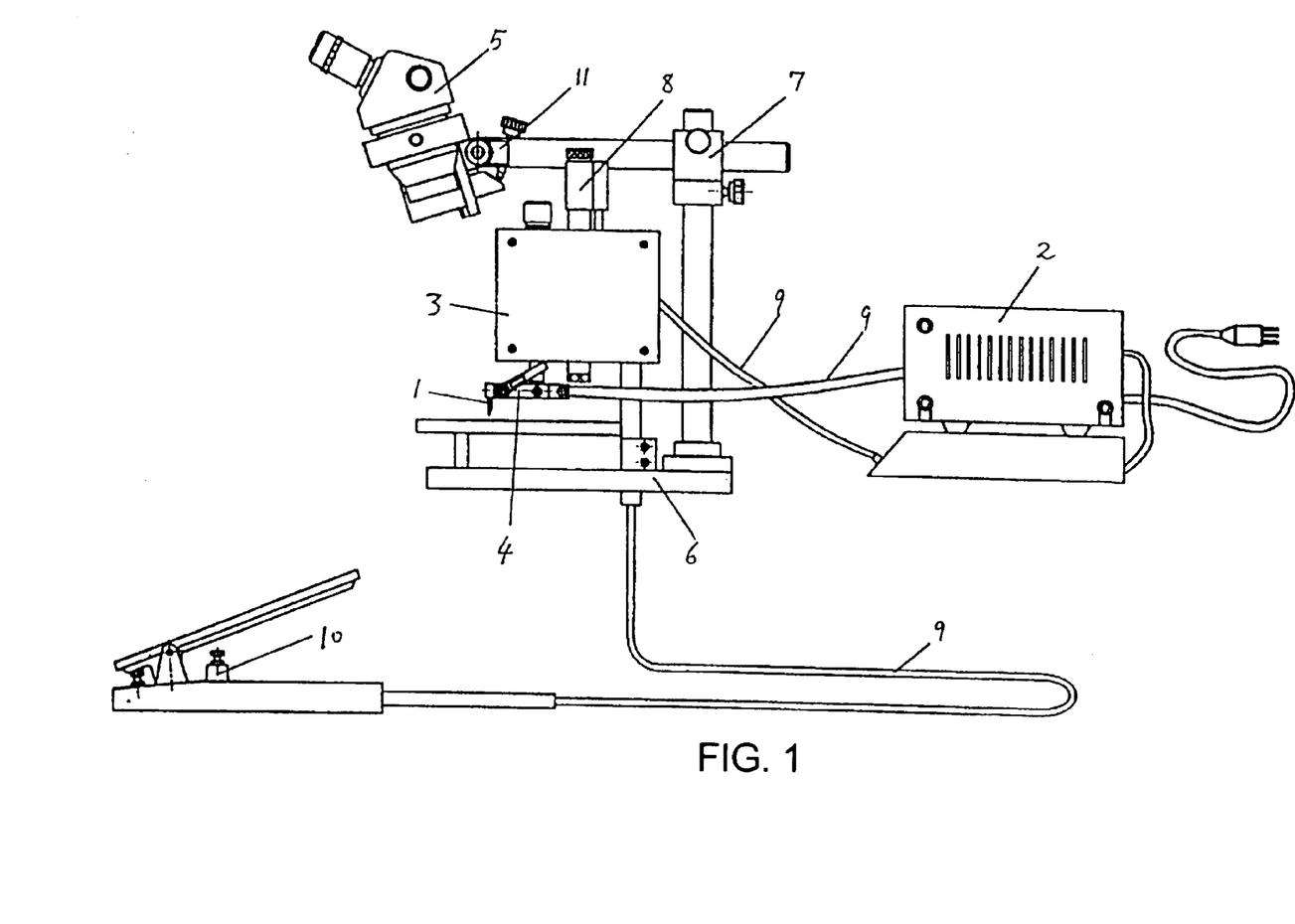
FIG. 1 is a general structural drawing of one embodiment of the present invention.

According to FIG. 1, an embodiment of the present invention is shown comprising of an electrode (1); a main processor (2), which functions to adjust the power supply; a weld head (3), which is installed on the worktable (6). The weld head (3) includes an electrode clamp (4) and a weld force adjusting device (8). A microscope (5) is affixed on a bracket (7) of the worktable (6) by an angle adjusting structure (11). In addition, the embodiment comprises a connecting wire (9) and a foot treadle switch (10).

Figure 2:
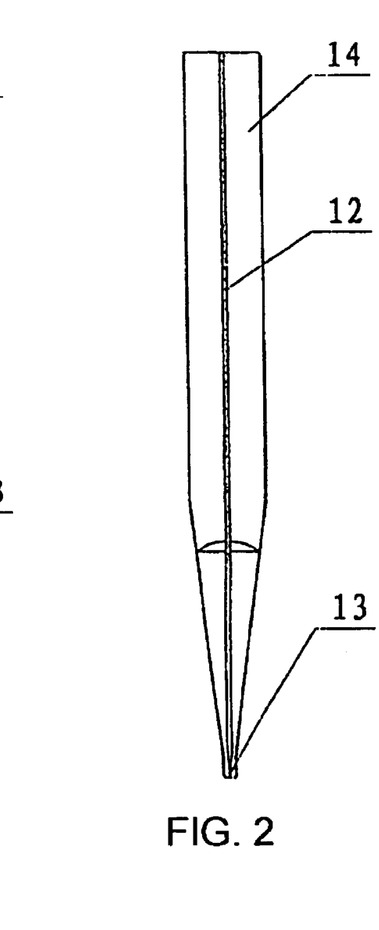
FIG. 2 is a structural drawing of the electrode of an embodiment of the present invention.

According to FIG. 2, the electrode (1) is made up of two combined parallel electrodes (14) which are made of high-temperature-resistant metal materials, such as tungsten, molybdenum, etc. The two parallel electrodes come to a tip (13) in mutual Ohm contact, where the contact resistance is generally less than or equal to 200 mΩ, the rest of the electrodes are mutually insulative. There is a gap (12) between the two parallel electrodes which can be agglutinated with an insulative surface mount adhesive such as chipbonder.

Figure 3:
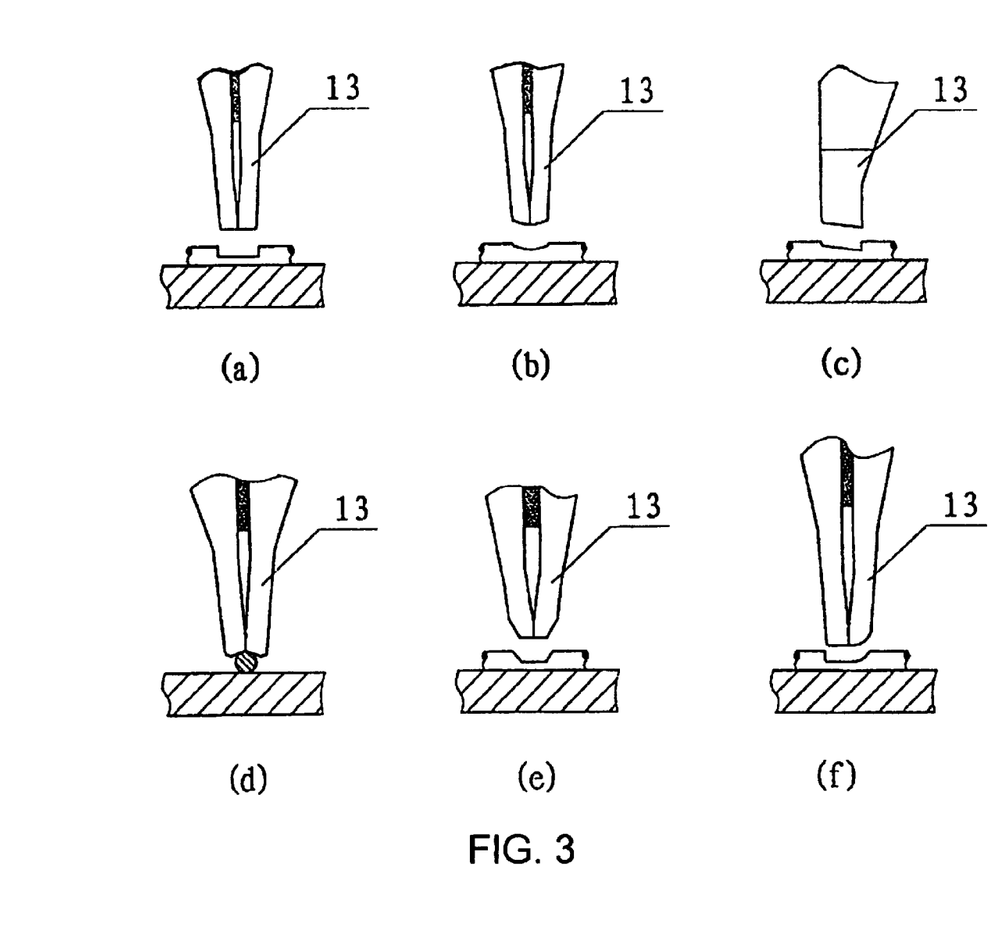
FIG. 3 is a structural drawing of the end face of the tip of the electrode of an embodiment of the present invention.

According to FIG. 3, the tip (13) of the electrode (1) can be formed in various types. As shown in (a) the end face of the electrode tip (13) is constructed as a plane type. In (b) the end face of the electrode tip (13) is constructed as a cambered surface type. In (c) the end face of the electrode tip (13) is constructed as an incline type. As shown in (d) the end face of the electrode tip (13) is V-shaped or concave arc shaped in construction. As shown in (e) the end face of the electrode tip (13) is cuneiform shaped in construction. As shown in (f) the end face of the electrode tip (13) is plane shaped on one side.

While welding, an end face of an electrode tip (13) that has a cylinder face construction can reduce the damage on enameled wires. The end face of an electrode tip (13) with the construction of an incline type has the function of cutting off welded enameled wires. Furthermore, the end face of an electrode tip (13) with a V-shaped construction has the function of making the enameled wire aim automatically at the center.

Figure 4:
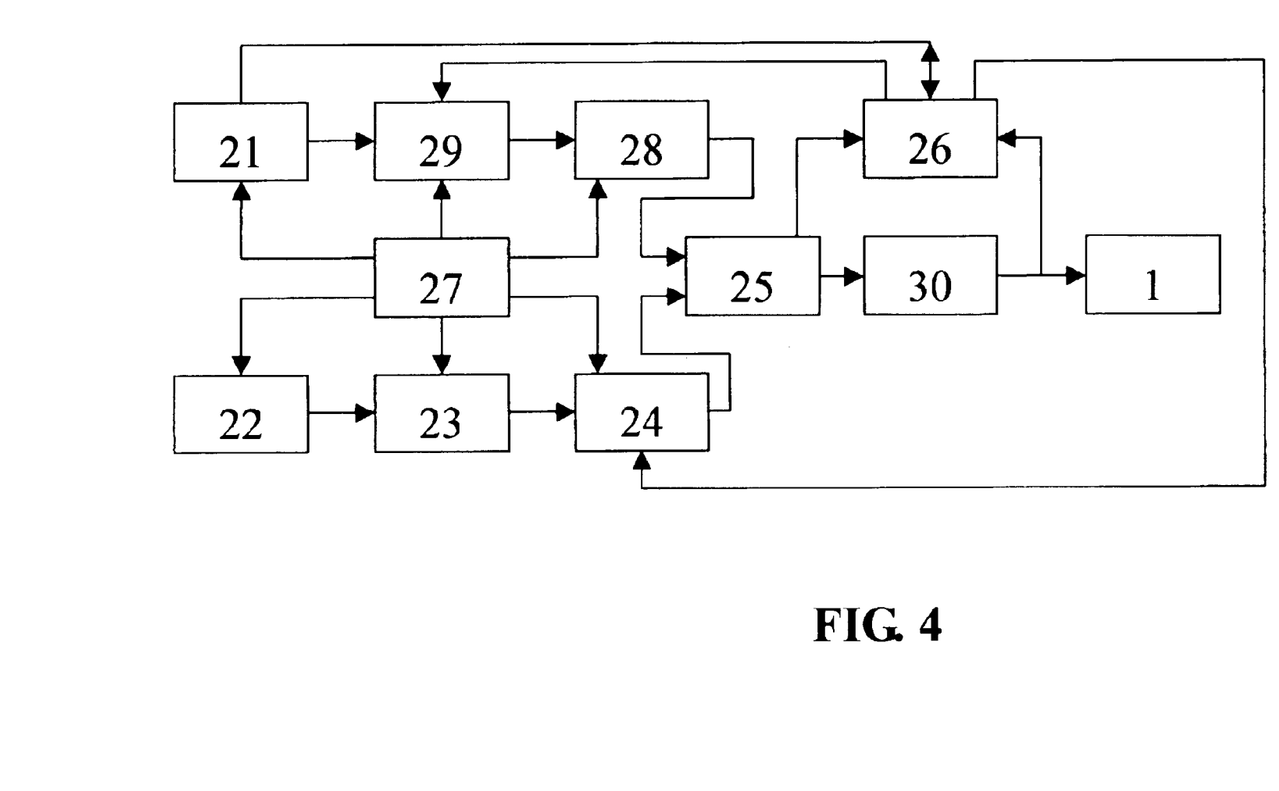
FIG. 4 is a connection block-diagram of the main processor circuit of an embodiment of the present invention.

According to FIG. 4, the relation of the connection block-diagram of the main processor circuit of the embodiment of the present invention can be described as follows: connect pulse amplitude preset circuit (21) with power switch circuit (25) through high voltage control circuit (29) and high voltage power supply circuit, and connect pulse width preset circuit (22) with power switch circuit (25) through pulse width timing circuit (23) and drive circuit (24). Then connect power switch circuit (25) with the electrode (1) where one circuit is through reactive circuit (26), the other is through pulse transformer (30). The outputs of the low voltage powersupply circuit (27), pulse amplitude preset circuit (21), high voltage control circuit (29), drive circuit (24) and pulse transformer (30) are separately connected with reactive circuit (26). Pulse amplitude preset circuit (21), high voltage control circuit (29), high voltage power supply circuit (28), pulse width preset circuit (22), pulse width timing circuit (23) and drive circuit (24) are separately connected with low voltage power supply circuit (27).

The function of pulse amplitude preset circuit (21) is to have the secondary output pulse amplitude of pulse transformer corresponds with the preset value of a numeric switch. Namely, the output pulse amplitude is 0.01–1.99V, where the distinguish ability is 0.01V. The function of pulse amplitude preset circuit (22) is to have the secondary output waveform width of pulse transformer corresponds with the preset value. In particular, the output pulse width is 1–19 ms, with a distinguish ability of 1 ms. The function of pulse width timing circuit (23) is to have the output pulse width as 1–19 ms according to the preset value of the numeric switch. The function of drive circuit (24) is that of magnifying the pulse signal produced by SCM and providing enough power switch to drive the signals.

The function of power switch circuit (25) is to have the secondary output waveform of pulse transformer corresponds with the output parameters preset by a voltage numeric switch TV and time numeric switch TT, i.e., pulse width is 1–19 ms, pulse amplitude is 0.01–1.99V. The reactive circuit (26) performs under a certain preset voltage of transformer secondary, the output transformer outputs a different voltage according to different requests of load resistance. Low voltage power supply circuit (27) generates voltage of ±15V,±5V, and ±24V so as to meet the demand of the circuit. The function of high voltage control circuit (29) is to make the output amplitude correspond to 0.01–1.99V according to the preset value (0.01–1.99V) of the numeric catch plate switch.

Figure 5:
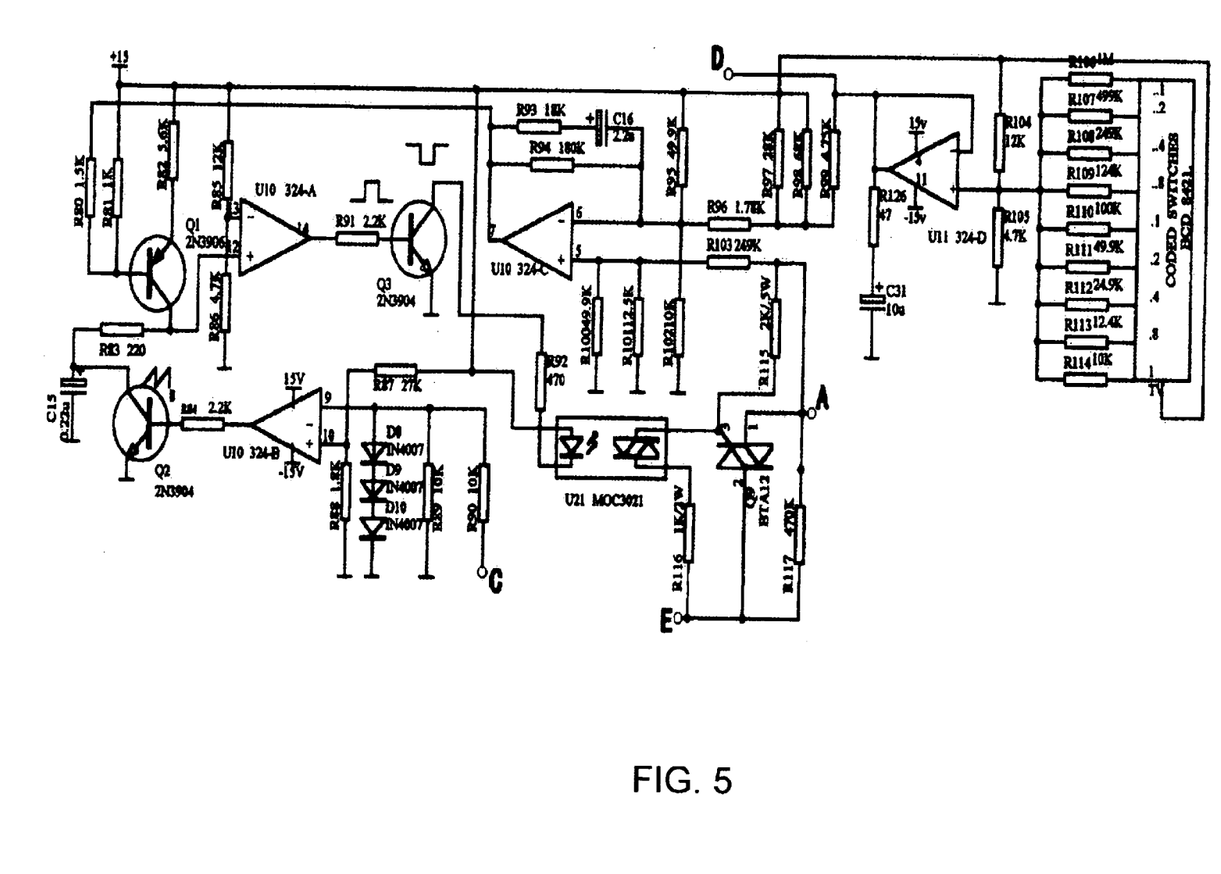
FIG. 5 is a connection diagram showing points A, C and D of the circuit of an embodiment of the present invention.
Figure 6:
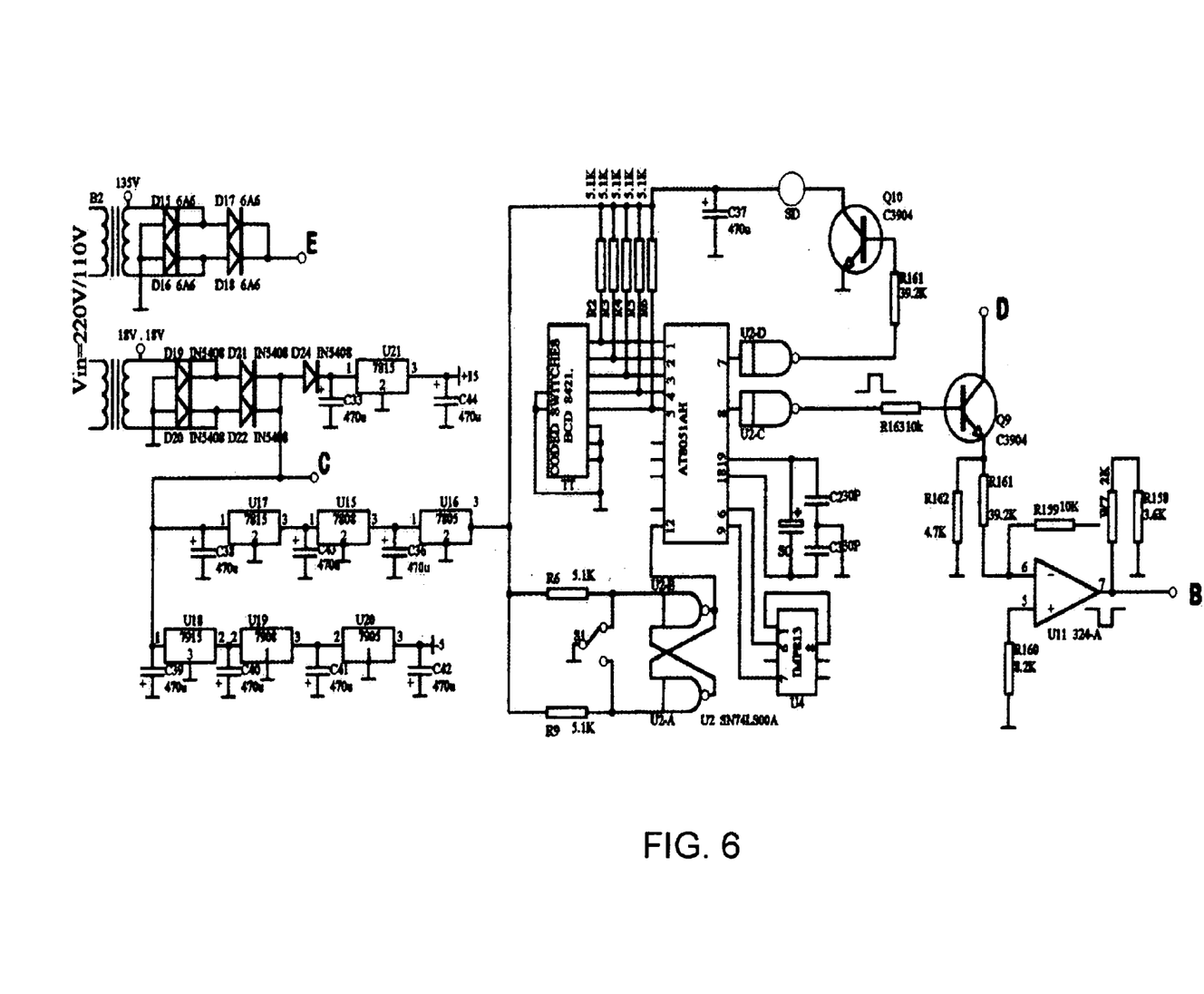
FIG. 6 is a connection diagram showing points B, D, C and E of the circuit of the embodiment of the present invention.
Figure 7:
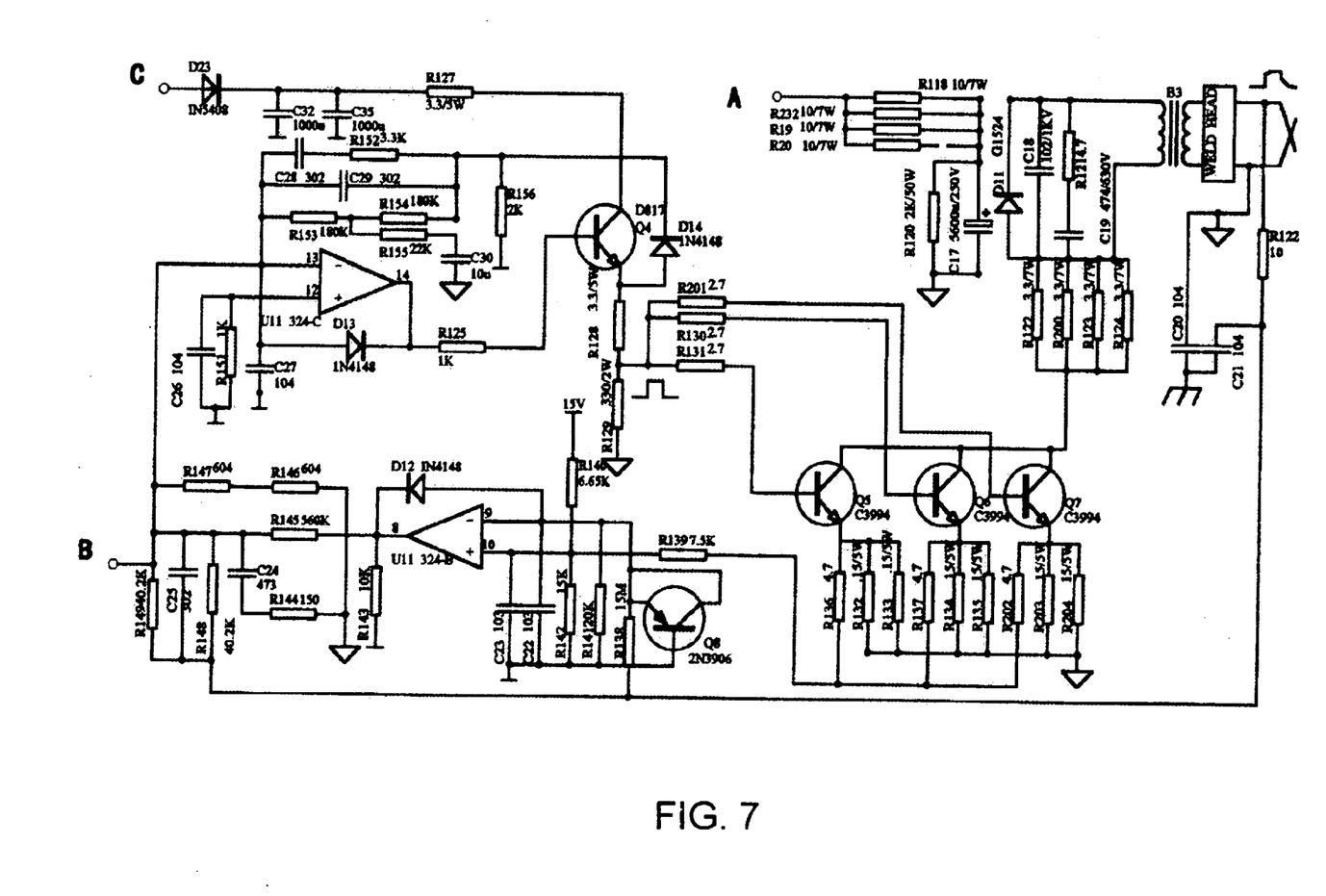
FIG. 7 is a connection diagrams showing points A, B and C of the circuit of an embodiment of the present invention.

According to FIG. 5 through FIG. 7, points A, B, C, D, E are corresponding points of connection between the circuits of each figure. The general circuitry connection of the embodiment of the present invention is described as follows: pulse amplitude preset circuit (21) via numeric switch (Type: CODED SWITCHES BCD 8421) individually through R106, R107, R108, R109, R110, R112, R113, R114 and connect with the positive input of four operational amplifiers circuit U11 324-D (Type: 324), then connect with the negative input of four operational amplifiers circuit U10 324-A of high voltage control circuit (29) through resistance R99, and R96 from the outputs of U11 324-D, after connecting with transistor Q1 amplifying circuit through the output, and the input from the positive input of four operational amplifiers circuit U10 324-A, and connect the cathode of the output of photoelectric coupling circuit U21 (Type: MOC3021) through transistor Q3 from the output. The anode of the input of photoelectric coupling circuit U21 connects the positive input of four operational amplifiers circuit U10 324-B; one end of the output connects on SCR BAT12 triggered pole of high voltage power supply circuit (28); the other end connects on the bridge type rectification circuit output which is made of rectifier diode D15–D18 (Type: 6A6) and the anode of SCR BTA12 through R116.

The cathode of SCR BTA12 has a parallel connection of primary coil of pulse transformer B3 through resistance R118, R232, R19 and R20. The pulse width preset circuit (22) is connected with SCM AT89C51's I/O: 1, 2, 3, 4 and 5 of pulse width timing circuit (23) through the numerical switch TT (Type: CODED SWITCHES BCD 8421); SCM individually connects with four double input and non-gate IC U2 (Type: 74LS00), reset IC U4 (Type: IMP813), crystal vibration circuit SO with frequency of 12 MZ. U2-A and U2-B are connected according to a stable state circuit, U2-D's output is connected with the buzzer SD.

While closing the microswitch, it is carried into execution, the trigger action is made up of U2-A and U2-B. AT89C51 executes halt of the subprogram, and makes SCM AT89C51's eighth foot output one timing pulse, where its function is preset according to a numerical switch, the output pulse width is 1–19 ms, and the pulse makes the buzzer work through reaching the drive circuit by non-gate U2-C. Simultaneously, SCM AT89C51's seventh foot output signals are magnified by transistor Q10 (C3904). Four double input and non-gate IC U2-C's output are connected with drive circuit (24)'s base electrode of transistor Q9 (C3904). Transistor Q9 emitter output is connected on reactive circuit (26)'s negative input of four operational amplifiers circuit U11 324-A (Type: 324) through resistance R161. The output of IC U11 324-A is connected with the negative input of four operational amplifiers circuit U11 324-A (Type: 324) through R157. The output of IC U11 324-C is connected with the base electrode of transistor Q4 through R125. The serial contact points of emitter resistance R128 and R129 of output Q4 are connected with the base electrodes of high-speed, heavy current power switch Q5, Q6 and Q7 (Type: C3994), dividedly through R201, R130 and R131. The collecting electrodes of Q5, Q6 and Q7 are connected with primary coils of pulse transformer B3 through load resistance R122, R123, R124 and R200; the secondary coil of pulse transformer B3 is connected with the electrode. The emitters of Q5, Q6 and Q7 are separately grounding by resistance R132, R133, R134, R135, R203 and R204. Another circuit is connected with the positive input of four operational amplifiers circuit U11 324-B and connected with a 15V power supply through R136, R137 and R202. The negative input of IC U11 324-B is connected with the secondary coil of pulse transformer B3; the output is connected with the negative input of IC U11 324-C.

Low voltage power supply circuit (27) is made up of the bridge type rectifier circuit made of rectifier diode D19–D24 (Type: 5408) and three-terminal voltage stabilization IC circuits U21 (7815), U17 (7815), U18 (7915), U19 (7908), U20 (7905), and generates a voltage of ±15V, ±5V and ±24V. Separately connected are the base electrode of transistor Q1 via R81, the emitter of transistor Q1 via R82, the negative input of four operational amplifiers circuit U10 324-A via R85, the negative input of four operational amplifiers circuit U10 324-C via R95, the positive input of four operational amplifiers circuit U11 324-D via R104, the negative input of four operational amplifiers circuit U10 324-B via R90, and the collecting electrode of transistor Q4 via R127.

Figure 8:
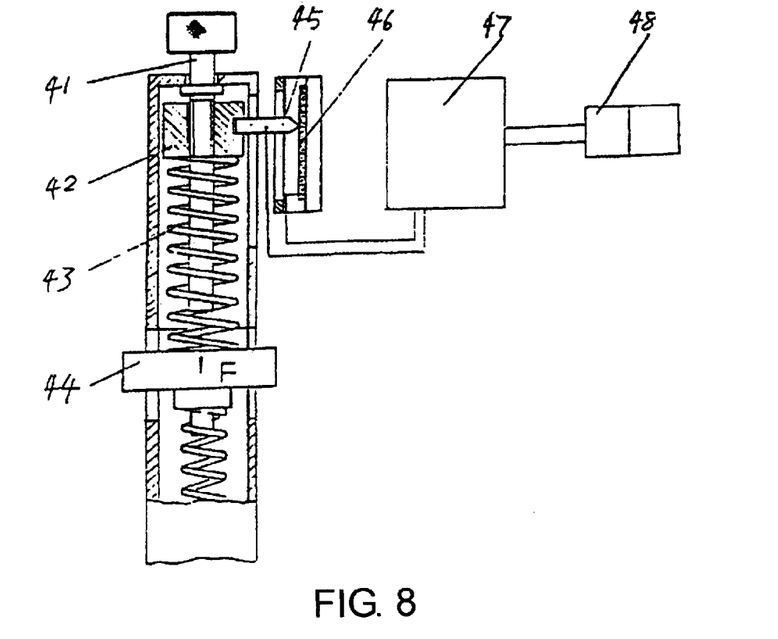
FIG. 8 is a structural drawing of a weld force adjusting device of an embodiment of the present invention.

According to FIG. 8, the adjusting device of the electrode force comprises of a temper screw (41), an adjusting nut (42) which is attached to the temper screw (41), a spring (43) harnessed on the adjusting nut (42), and a restricting position clamp (44). The weld force can be conveniently displayed by having a sampling slide-wire resistance, a function converter and a digital display attached to the adjusting device of the weld force, where the movable contact (45) of the sampling slide-wire resistance (46) is fixed onto the adjusting nut (42). Connect the input of the function converter (47) and one of the closed terminations with the movable contact, and connect the output and the digital display (48).

Figure 9:
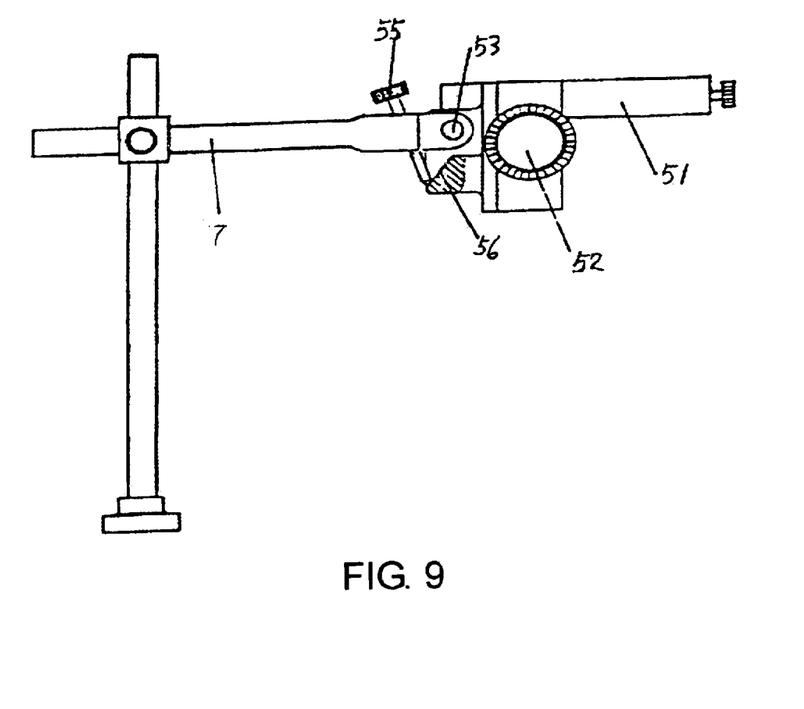
FIG. 9 is a structural drawing of a microscope angle adjusting structure of an embodiment of the present invention.

According to FIG. 9, the angle regulating gear of the microscope is made up of the horizontal axis of the gemel focus tray, temper screw (55) and supporting plane. The focus tray (51) is hinged on the bracket (7) through the horizontal axis (53), and there is a focus handwheel (52) on the focus tray (51). Install the temper screw (55) on the bracket (7), and install the regulating supporting plane (56) on the focus tray (51). The temper screw (55) is perpendicular to the horizontal axis (53), the supporting plane is parallel to horizontal axis (53), and the end of the temper screw (55) presses firmly on the supporting plane. The optical device continuously adapts the adjustable stereomicroscope to a strong cubic effect, a large and clear field of vision, and a 7–40 magnification. The specially designed angle regulating gear allows the microscope to have very flexible and convenient adjustment of fluctuation, in the front and back, around it and in different angles. The illuminator is provided by a specially produced shadowless fluorescent lamp or spot illuminator. A mini-lamp has the characteristics and advantages of soft and natural light, of having a light color with high fidelity, and an apparent effect of mitigating visual fatigue, etc. The electrode force adjusting device is made up of a temper screw, an adjusting nut that attaches to the adjusting screw, a string harnessed on the adjusting screw, and a restricting position clamp.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A spot electric welding machine which directly welds enameled wires, comprising:
    a. an electrode;
    b. a main processor functioning as a power supply control;
    c. a weld head comprising:
        i. an electrode clamp and
        ii. adjusting device of electrode force,
    wherein the electrode is made into two combined parallel electrodes made of high-temperature-resistant metal, said two parallel electrodes each having an electrode tip are positioned into mutual Ohm contact, wherein the tips of the two electrodes contact each other, and a remainder of the weld head held is mutually insulative.

2. The spot electric welding machine of claim 1, wherein the main processor comprises: a pulse amplitude presetting circuit, a pulse width presetting circuit, a pulse width timing circuit, a drive circuit, a power switch circuit, a reactive circuit, a low voltage power supply circuit, a high voltage power supply circuit and a high voltage control circuit,
    wherein the pulse amplitude presetting circuit is connected with the power switch circuit through the high voltage control circuit and the high voltage power supply circuit;
    the pulse width presetting circuit is connected with the power switch circuit through the pulse width timing circuit and drive circuit;
    the power switch circuit is connected with the electrode wherein one circuit is connected through the reactive circuit, another circuit is connected through a pulse transformer;
    a plurality of outputs of the pulse amplitude preset circuit, the high voltage amplitude preset circuit, the high voltage control circuit, the drive circuit and the pulse transformer are separately connected with the reactive circuit;

the pulse amplitude preset circuit, the high voltage control circuit, the high voltage power supply circuit, the pulse width preset circuit, the pulse width timing circuit and the drive circuit are separately connected with the low voltage power supply circuit.

3. A spot electric welding machine which can directly weld enameled wires according to claim 1, wherein the main processor of the spot electric welding machine has a circuitry connection comprising:

a pulse amplitude preset circuit connected via a numeric switch individually through R106, R107, R108, R109, R110, R112, R113, R114 with a positive input of four operational amplifiers circuit U11 324-D (Type: 324);

a connection with a negative input of a four operational amplifiers circuit U10 324-A of a high voltage control circuit through resistance R99 and R96 from a plurality of outputs of U11 324-D, after connecting with a transistor Q1 amplifying circuit through an output, and input from a positive input of four operational amplifiers circuit U10 324-A;

a connection with a cathode of an output of a photoelectric coupling circuit U21 (Type: MOC3021) through a transistor Q3 from the output;

an anode of an input of photoelectric coupling circuit U21 connecting a positive input of a four operational amplifiers circuit U10 324-B, wherein an end of an output connects to a SCR BTA 12 triggered pole of a high voltage power supply circuit, another end of said output connects with a bridge type rectification circuit output which is made of a plurality of rectifier diodes D15–D18 (Type: 6A6) and connects with said anode of SCR BTA12 through R116;

a cathode of SCR BTA12 having a parallel connection of a primary coil of a pulse transformer B3 through a plurality of resistance R118, R232, R19 and R20;

a pulse width preset circuit connecting with a SCM AT89C51's I/O: 1, 2, 3, 4 and 5 of a pulse width timing circuit through a numerical switch TT (Type: CODED SWITCHES BCD 8421), said SCM individually connecting with four double input and non-gate IC U2 (Type: 74LS00), a reset IC U4 (Type: IMP813), and a crystal vibration circuit SO with frequency of 12 MZ; U2-A and U2-B connected according to a stable state circuit;

an output from U2-D connected with a buzzer SD;

wherein closing a microswitch puts the embodiment into execution; a trigger action comprising U2-A and U2-B;

a AT89C51 which executes part of a subprogram, causing a SCM AT89C51's eighth foot output one timing pulse, having a function preset according to a numerical switch, having an output pulse width of 1–19 ms, said pulse making said buzzer work through reaching a drive circuit by a non-gate U2-C, simultaneously magnifying SCM AT89C51's seventh foot output signals by a transistor Q10 (C3904);

an output of four double input and non-gate IC U2-C connected with a drive circuit base electrode of a transistor Q9 (C3904); said transistor Q9 having an emitter output connected on a reactive circuit having a negative input of a of four operational amplifiers circuit U11 324-A (Type: 324) through a resistance R161;

an output of an IC U11 324-A connected with a negative input of a four operational amplifiers circuit U11 324-A (Type: 324) through a R157;

an output of an IC U11 324-C connected with a base electrode of a transistor Q4 through a R125;

a plurality of serial contact points of emitter resistances R128 and R129 of an output Q4 connected with a plurality of base electrodes of a plurality of high-speed, heavy current power switches Q5, Q6 and Q7 (Type: C3994), dividedly through R201, R130 and R131;

a plurality of collecting electrodes of Q5, Q6 and Q7 connected with a plurality of primary coils of a pulse transformer B3 through load resistances R122, R123, R124 and R200, wherein a secondary coil of pulse transformer B3 is connected with the electrode;

a plurality of emitters of Q5, Q6 and Q7 separately grounded by resistances R132, R133, R134, R135, R203 and R204;

another circuit connected with a positive input of a four operational amplifiers circuit U11 324-B and connected with a 15V power supply through R136, R137 and R202;

a negative input of IC U11 324-B connected with the secondary coil of pulse transformer B3, an output is connected with a negative input of IC U11 324-C;

a low voltage power supply circuit comprising:

a bridge type rectifier circuit having a plurality of rectifier diodes D19–D24 (Type: 5408) and three-terminal voltage stabilization IC circuits U21 (7815), U17 (7815), U18 (7915), U19 (7908), U20 (7905), generating a voltage of ±15V, ±5V and ±24V, a plurality of separate connections of a base electrode of a transistor Q1 via R81, an emitter of transistor Q1 via R82, a negative input of a four operational amplifiers circuit U10 324-A via R85, a negative input of a four operational amplifiers circuit U10 324-C via R95, a positive input of a four operational amplifiers circuit U11 324-D via R104, a negative input of four operational amplifiers circuit U10 324-B via R90, and a collecting electrode of a transistor Q4 via R127.

4. A spot electric welding machine which can directly weld enameled wires according to claim 1, further comprising a sampling slide-wire resistance, a function converter and a digital display attached on an adjusting device of weld force; a movable contact of the sampling slide-wire resistance affixed on an adjusting nut; an input of the function converter and one of a plurality of closed terminations are connected with the movable contact, and an output is connected with digital display.

5. A spot electric welding machine which can directly weld enameled wires according to claim 1, further comprising a microscope which is installed on a gemel focus tray of the spot electric welding machine wherein the microscope is connected with a bracket through an angle regulating gear of said microscope; the angle regulating gear of said microscope comprises a horizontal axis of the gemel focus tray having a focus handwheel, a temper screw and a supporting plane; said gemel focus tray is hinged on the bracket through the horizontal axis; said temper screw is installed on the bracket; and the supporting plane is installed on the gemel focus tray; whereby the temper screw is perpendicular to the horizontal axis, the supporting plane is parallel to the horizontal axis, and an end of the temper screw presses firmly on the supporting plane.

* * * * *